3,020,299
ORGANOSILICON COMPOSITIONS
James Marsden, Schenectady, N.Y., assignor to General Electric Company, a corporation of New York
No Drawing. Filed Aug. 15, 1958, Ser. No. 755,138
4 Claims. (Cl. 260—448.2)

This invention is concerned with novel silylarylene compositions. More particularly, the invention relates to a silylarylene composition selected from the class consisting of (1) a compound having the formula (I) 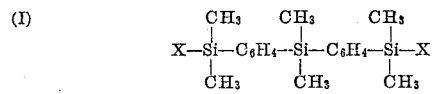

where X is selected from the class consisting of bromine, chlorine, and the hydroxyl group, and (2) polymers derived from (1) having the recurring structural unit (II) 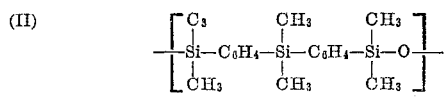

Such polymers may have from 10 to 1,000 of such recurring units, in addition to which the polymer can have terminal silicon-bonded hydroxyl groups.

The monomeric hydrolyzable halogenosilanes described in Formula I above were prepared as follows: 280 grams dimethyldichlorosilane, 52.5 grams magnesium, and 4000 ml. diethyl ether were placed in a three-neck reaction flask. Thereafter, 200 grams dimethyl-para-dibromophenylsilane [$BrC_6H_4Si(CH_3)_2C_6H_4Br$] dissolved in 540 ml. ether was added to the stirred reaction mixture over a period of 2.5 hours. The reaction mixture was heated at the reflux temperature of the mass for an additional 8 hours, and then filtered to remove magnesium halides. The solvent and unreacted dimethyldichlorosilane (which was employed in excess) was removed by distillation at atmospheric pressure. The resulting mixture (about 233 grams in weight) was distilled at reduced pressure to yield about 85 grams of a solid product boiling within the range of 175° C.–210° C. at 0.2 mm. Analysis of this compound showed that this product was a mixture of bis(para-dimethyl bromosilyl phenyl)dimethylsilane and bis(para-dimethyl chlorosilyl phenyl) dimethylsilane (and probably the mixed bromochloro derivative of Formula I where one X is chlorine and one X is bromine). In this mixture, there was present about 23 equivalent percent of the bromo derivative and about 77 equivalent percent of the chloro derivative as evidenced by the fact that analysis for chlorine and silicon of the mixture showed that the product contained 13.1% chlorine and 19.6% silicon as contrasted to the theoretical values of a similar mixture of 13.7% chlorine and 19.5% silicon. By distillation through a more efficient fractionating column, one can separate the bis-dichloro derivative from the bis-dibromo derivative.

The above-described halosilane product composed of the bromo and chlorosilanes which distilled within the range of 175–210° C. at 0.2 mm. was dissolved in 300 ml. diethyl ether and added slowly over a period of 2.5 hours with stirring to 1200 ml. of a saturated solution of sodium bicarbonate and 750 ml. ether. Stirring was then continued for an additional one hour at room temperature (about 27° C.). The organic solution was separated and dried with anhydrous sodium carbonate and filtered. The product of hydrolysis, that is, the silanol, thus obtained was recrystallized from hot toluene, and the white crystals obtained were found to have a melting point of 126° C. This compound was analyzed and found to correspond to Formula I where each X is an hydroxyl group as evidenced by the fact that it was found to have 60.4% carbon, 8.2% hydrogen and 22.0% silicon as contrasted to the theoretical values for the disilanol of 60.1% carbon, 7.57% hydrogen, and 23.42% silicon. This structure was also confirmed by molecular weight determination.

The above prepared disilanol was polymerized with KOH in the presence of a stream of nitrogen which was passed over the surface of the polymerizing mass. More particularly about 4.6 ml. of KOH solution (0.0052 gram KOH per 100 ml. water) was added to 4.6 grams of the above-described disilanol. The water was removed by heating at about 80° C. and passing a stream of nitrogen over the surface of the mixture. After all the water added was removed, the silanol was heated above its melting point to cause polymerization. Heating was continued for one-half hour at 160° C., one hour at 180–200° C., and 17 hours at 200–225° C. The resulting polymer was a viscous liquid at 150° C. and upon cooling to room temperature was an elastic solid. This polymer was dissolved in benzene and washed with water to remove the catalyst. The polymer was precipitated from the benzene solution with methyl alcohol. After removal of the solvent by evaporation, the polymer was a clear, elastic solid. It was comprised of the recurring unit (II) 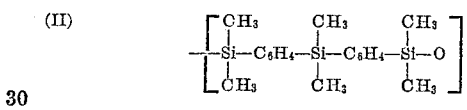

This clear, elastic, solid polymer can be mixed with fillers such as finely divided silica (e.g., fume silica, silica aerogel, precipitated silica, etc.) in amounts ranging from 0.2 to 2 weight parts of filler per weight part of the solid polymer, and with small amounts of benzoyl peroxide or other organic peroxides capable of effecting cure of the polymer, the amount of peroxide used being within the range of from about 0.1 to 8%, by weight, based on the weight of the solid elastic product. This mixture of ingredients can be heated at elevated temperatures to about 125 to 250° C. for times ranging from 1 to 3 hours to effect cure and vulcanization of the mixture to the substantially infusible and insoluble state.

Such organopolysiloxane solids can be employed in various applications where the usual organopolysiloxane rubbers are used. Thus, these cured solid elastic polymers can be used as gasket materials where it is desired to have good heat resistance at elevated temperatures and yet have a gasket which is capable of remaining flexible at temperatures as low as −70 to −100° C. The uncured mixture of the solid elastic polymer, filler, and curing agent can also be dissolved and suspended in various solvents such as benzene and toluene, and used to coat various cloths, such as glass cloth, to make heat resistant tapes which can be used for insulation of various electrical apparatus including electrical conductors. Alternatively, a copper core can be passed through the solution-dispersion of the aforesaid elastic polymer, filler and curing agent, and thereafter the coated conducted can be passed into a heated zone to effect curing of the insulation to give a heat-resistant outer insulation for the metallic conductor. The dihalogenosilanes and the dihydroxy derivative of Formula I are useful as intermediates in the preparation of the polymeric methylpolysiloxanes described in Formula II. In addition, the halogenosilanes of Formula I can be used to treat various solid bodies, such as masonry, textiles, paper, etc., and allow the treated body to hydrolyze by means of the moisture in the air, thereby to deposit a film on the solid body to render the latter water-repellent.

The dihydroxy derivatives of Formula I can be intercondensed with other organopolysiloxanes such as cyclic polysiloxanes (e.g., octamethylcyclotetrasiloxane, octaphenylcyclotetrasiloxane, etc.), to give interpolymers having recurring units such as Formula II, and in addition, dimethylsiloxy and diphenylsiloxy units.

What I claim as new and desire to secure by Letters Patent of the United States is:

1. A composition of matter having the formula

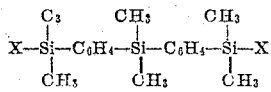

where X is selected from the class consisting of bromine, chlorine, and the hydroxyl group.

2. Bis(p-dimethylchlorosilylphenyl)dimethyl silane.
3. Bis(p-dimethylbromosilylphenyl)dimethyl silane.
4. A composition having the formula

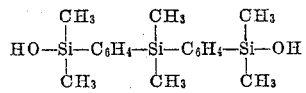

References Cited in the file of this patent

UNITED STATES PATENTS

| | | | |
|---|---|---|---|
| 2,352,974 | Rochow | | July 4, 1944 |
| 2,507,515 | Clark | | May 16, 1950 |
| 2,557,931 | Barry | | June 26, 1951 |
| 2,562,000 | Sveda | | July 24, 1951 |

FOREIGN PATENTS

| | | | |
|---|---|---|---|
| 696,572 | Great Britain | | Sept. 2, 1953 |

OTHER REFERENCES

Sommer et al.: J.A.C.S., 69, 980 (1947), page 980 relied upon.

UNITED STATES PATENT OFFICE
CERTIFICATION OF CORRECTION

Patent No. 3,020,299                           February 6, 1962

James Marsden

It is hereby certified that error appears in the above numbered patent requiring correction and that the said Letters Patent should read as corrected below.

Column 1, formula (II) should appear as shown below instead of as in the patent:

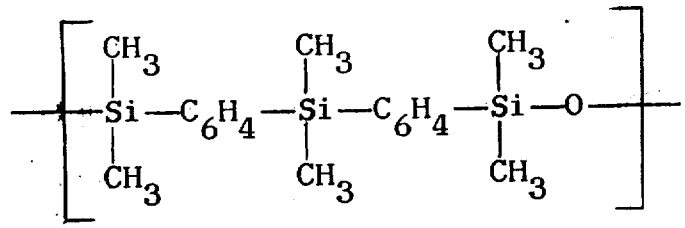

column 3, lines 9 to 13, the formula should appear as shown below instead of as in the patent:

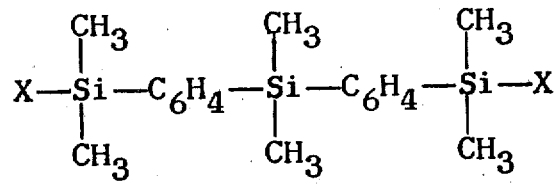

Signed and sealed this 19th day of June 1962.

(SEAL)
Attest:

ERNEST W. SWIDER                             DAVID L. LADD
Attesting Officer                                 Commissioner of Patents